United States Patent
Koedam et al.

[19]

[11] Patent Number: 5,865,678
[45] Date of Patent: Feb. 2, 1999

[54] TWO-PIECE THRUST WASHER FOR UNIVERSAL JOINT

[75] Inventors: James G. Koedam, Mount Juliet, Tenn.; Daniel C. Perry, Temperance, Mich.

[73] Assignee: Dana Corporation, Toledo, Ohio

[21] Appl. No.: 766,128

[22] Filed: Dec. 16, 1996

[51] Int. Cl.⁶ .................................................... F16D 3/41
[52] U.S. Cl. .................. 464/128; 384/127; 384/371; 464/131
[58] Field of Search ...................... 464/128, 131, 464/136, 130, 134; 384/564, 126, 127, 425, 371, 368

[56] References Cited

U.S. PATENT DOCUMENTS

| | | |
|---|---|---|
| 2,078,739 | 4/1937 | Slaght . |
| 2,587,408 | 2/1952 | Trask ................................. 384/371 X |
| 2,996,901 | 8/1961 | Kleinschmidt . |
| 3,050,351 | 8/1962 | Kempf ............................... 384/425 X |
| 3,316,035 | 4/1967 | Zuber ..................................... 384/127 |
| 3,344,689 | 10/1967 | Naumann ........................... 384/127 X |
| 3,399,007 | 8/1968 | Remmers et al. ..................... 384/371 |
| 3,635,535 | 1/1972 | Schultenkamper ..................... 384/371 |
| 3,674,325 | 7/1972 | Moroney et al. ....................... 384/127 |
| 4,050,130 | 9/1977 | Ditner . |
| 4,371,357 | 2/1983 | Petrzelka et al. . |
| 4,419,086 | 12/1983 | Condon . |
| 4,448,550 | 5/1984 | Moroney ............................... 384/127 |
| 4,637,740 | 1/1987 | Olschewski et al. ............... 464/128 X |
| 4,854,738 | 8/1989 | Linnemeier .............................. 384/127 |
| 4,934,979 | 6/1990 | Gille et al. ............................. 464/130 |
| 5,106,342 | 4/1992 | Fisher ..................................... 384/126 |
| 5,286,115 | 2/1994 | Toji et al. ............................... 384/127 |

FOREIGN PATENT DOCUMENTS

| | | | |
|---|---|---|---|
| 2616020 | 10/1977 | Germany .................................. 384/425 |
| 223753 | 10/1924 | United Kingdom ................... 384/425 |

Primary Examiner—Eileen A. Dunn
Attorney, Agent, or Firm—MacMillan, Sobanski & Todd LLC

[57] ABSTRACT

An annular two-piece thrust washer for use between the end wall of a bearing cup and the axially outer ends of the bearings and trunnion of a universal joint assembly includes a first piece and a second piece. The first piece is sized to be disposed between the axially outer ends of the bearings and the end wall of the bearing cup. In a preferred embodiment, a circumferential recess is formed at the junction between the radially inner surface and the axially outer surface of the first piece. The second piece of the thrust washer is sized to be disposed between the trunnion and the end wall of the bearing cup. When assembled, the second piece of the thrust washer is disposed within the first piece. The outer circumferential portion of the second piece extends into the circumferential recess of the first piece. A predetermined small clearance is provided between the first piece and the second piece which allows a limited amount of relative movement therebetween.

22 Claims, 3 Drawing Sheets

TWO-PIECE THRUST WASHER FOR UNIVERSAL JOINT

BACKGROUND OF THE INVENTION

This invention relates in general to universal joint assemblies and in particular to an improved structure for a thrust washer for use between a bearing cup and a trunnion in a universal joint assembly.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly therefrom. The trunnions are oriented in a single plane and extend at right angles relative to one another. A hollow cylindrical bearing cup having a cylindrical side wall and a circular end wall is mounted on the end of each of the trunnions. A plurality of bearings, such as needle bearings or roller bearings, are provided between the trunnion and the associated bearing cup to permit relative rotational movement therebetween. The bearing cups which are mounted on a first opposed pair of the trunnions can be connected to a first end yoke secured to an end of a first drive shaft section, while the bearing cups mounted on a second opposed pair of the trunnions can be connected to a second end yoke secured to an end of a second drive shaft section.

When the bearing cups are mounted on the opposed pair of trunnions, the end walls of the bearing cups are disposed adjacent to the axially outer ends of the trunnions and bearings. If the end walls of the bearing cups are fit tightly against the axially outer ends of the trunnions and bearings, friction between the surfaces during operation of the universal joint can generate heat and cause premature wear. If the bearing cups are fit loosely on the trunnions, the cross and trunnions can move back and forth within the opposed bearing cups during operation of the universal joint. This may create imbalance of the universal joint and generate undesirable noise and vibrations. Consequently, it is known to position thrust washers between the end walls of the bearing cups and the axially outer ends of the trunnions and bearings.

In the past, such thrust washers have been manufactured from a single annular piece of material having a first portion which engaged the axially outer end of the trunnion and a second portion which engaged the axially outer ends of the bearings. This structure performs well for most applications of universal joint assemblies. However, problems can occur when the universal joint assemblies are used in high speed, high angle, and low torque applications. In these situations,, the trunnion may become angled relative to the bearing cup and apply uneven pressure against the first portion of the thrust washer. When this occurs, one side of the first portion of the thrust washer is forced against the bearing cup, while the other side moves away from the bearing cup. Because the first and second portions of the thrust washer are formed as a single piece of material, the corresponding side of the second portion of the thrust washer also moves away from the bearing cup. When the bearings engage this side of the thrust washer, the thrust washer is subjected to significant wear and may eventually break apart. This can cause early failure of the bearing cup assembly. Accordingly, it would be desirable to provide a thrust washer for a universal joint assembly that avoids the potential problems occurring in high speed, high angle, and low torque applications.

SUMMARY OF THE INVENTION

This invention relates to a two-piece thrust washer for use between the end wall of a bearing cup and the axially outer ends of the bearings and trunnion of a universal joint assembly. The two-piece thrust washer is generally annular in shape. The thrust washer is formed from two separate pieces of material, a first piece and a second piece. The first piece is sized to be disposed between the axially outer ends of the bearings and the end wall of the bearing cup. In a preferred embodiment, a circumferential recess is formed at the junction between the radially inner surface and the axially outer surface of the first piece. The second piece of the thrust washer is sized to be disposed between the trunnion and the end wall of the bearing cup. When assembled, the second piece of the thrust washer is disposed within the first piece. The outer circumferential portion of the second piece extends into the circumferential recess of the first piece. The outer circumferential portion cooperates with the circumferential recess to prevent the second piece from falling out of the bearing cup when it is removed from the trunnion during shipment, assembly, and disassembly. A predetermined small clearance is provided between the first piece and the second piece which allows a limited amount of relative movement therebetween. If the trunnion applies uneven pressure against the second piece during operation of the universal joint assembly, the first piece is relatively unaffected and can move normally. As a result, the first piece is not subjected to excessive wear from engagement with the bearings.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
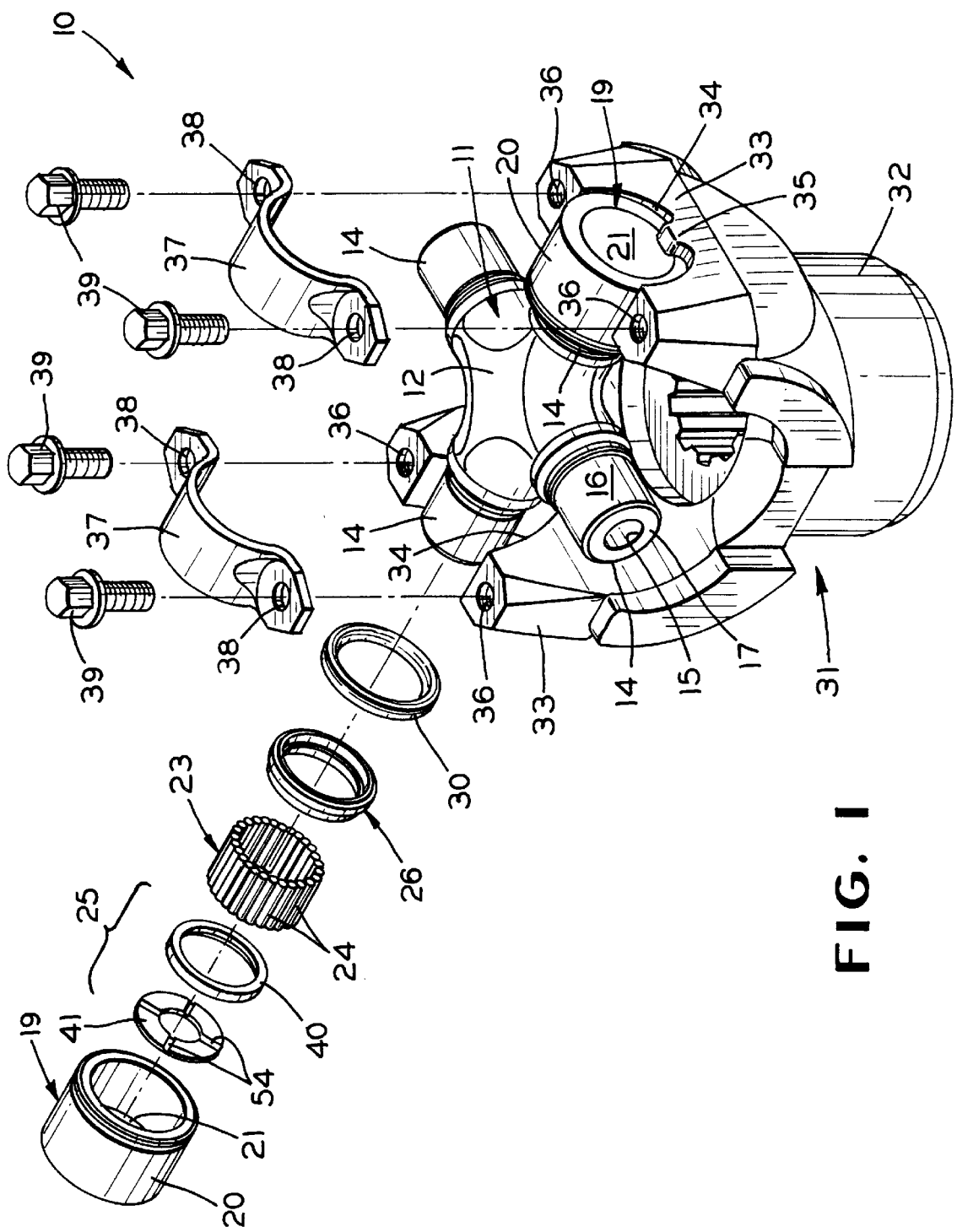
FIG. 1 is an exploded perspective view of a universal joint assembly including a two-piece thrust washer according to the invention disposed between a trunnion and a bearing cup.

Referring now to the drawings, there is illustrated in FIGS. 1 a portion of a universal joint assembly, indicated generally at 10, in accordance with this invention. Although this invention will be described and illustrated in relation to the illustrated universal joint assembly 10, it will be appreciated that the invention can be used with any type of universal joint assembly having trunnions and bearing cups. The universal joint assembly 10 includes a cross, indicated generally at 11, having a central body portion 12. The cross 11 includes four cylindrical trunnions 14 which extend radially outwardly from the body portion 12 in a common plane at right angles relative to one another. Each of the trunnions 14 is generally cylindrical in shape, including a cylindrical side surface 16 and an axially outer end 17. An annular chamfer 18 (see FIGS. 2 and 3) is formed at the junction between the cylindrical side surface 16 and the axially outer end 17 of each of the trunnions 14. The chamfer 18 is provided to facilitate assembly and to avoid sharp edges.

An internal passageway 15 is formed through each of the trunnions 14. The internal passageways 15 communicate with an internal chamber (not shown) formed in the body portion 12 of the cross 11. The internal chamber and internal passageways 15 are filled with lubricant during manufacture to provide a pre-lubricated assembly. In an alternate embodiment (not shown), a conventional lubrication fitting is mounted on the body portion 12 of the cross 11. The lubrication fitting provides one way fluid communication into the internal chamber for lubrication after manufacture.

Figure 3:
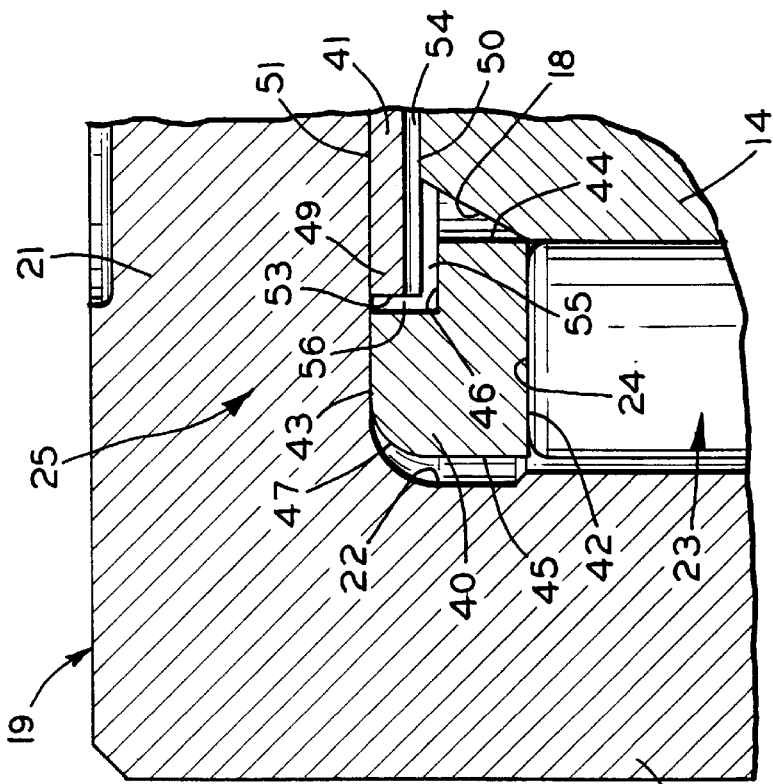
FIG. 3 is a further enlarged view of a portion of FIG. 2 illustrating in more detail the structure of the first embodiment of the two-piece thrust washer.
Figure 2:
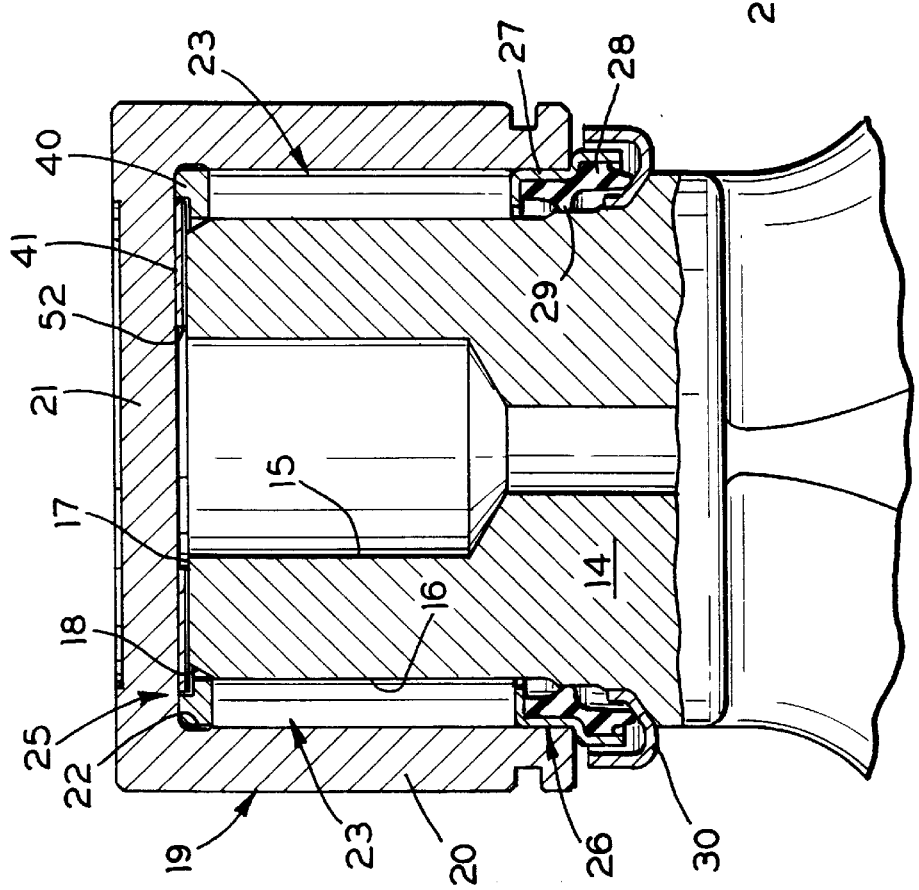
FIG. 2 is an enlarged elevational view, partially in cross section, of one of the trunnions illustrated in FIG. 1 having a bearing cup mounted thereon and a first embodiment of a two-piece thrust washer disposed between the trunnion and the bearing cup.

A bearing cup, indicated generally at 19, is mounted on the end of each of the trunnions 14. Each of the bearing cups 19 is generally hollow and cylindrical in shape, including a cylindrical side wall 20, and a circular end wall 21 defining a closed end. When assembled, the end wall 21 of the bearing cup 19 is disposed adjacent to the axially outermost end 17 of the trunnion 14. As best shown in FIGS. 2 and 3, an internal annular recess 22 is formed at the junction between the cylindrical side wall 20 and the end wall 21 of the bearing cup 19. During manufacture of the bearing cup 19, the recess 22 allows a grinding wheel to machine the entire inner surface of the cylindrical side wall 20 without binding against the end wall 21.

The bearing cups 19 are supported on the ends of the trunnions 14 for relative rotational movement. A plurality of bearings, indicated generally at 23, are provided between each of the bearing cups 19 and its associated trunnion 14 to permit low friction rotational movement therebetween. The bearings 23 may be embodied as a plurality of needle or roller bearings 23, as shown in the drawings. However, it will be appreciated that any type of bearing may be used to permit low friction rotational movement between the bearing cups 19 and the trunnions 14. The bearings 23 are disposed in an annular array between the outer cylindrical surface 16 of the trunnion 14 and the inner cylindrical side wall 20 of the associated bearing cup 19. Each of the bearings 23 includes an axially outer end 24. When the bearing cup 19 is assembled on the trunnion 14, the axially outer ends 24 of the bearings 23 are disposed adjacent to the end wall 21 of the bearing cup 19.

A two-piece thrust washer, indicated generally at 25, according to the present invention is provided between the axially outer ends 24 of the bearings 23 and the end wall 21 of the bearing cup 19. The two-piece thrust washer 25 will be described in more detail below. A generally annular seal assembly, indicated generally at 26, is disposed about the open end of the bearing cup 19. The seal assembly 26 is conventional in the art and includes a rigid support ring 27 having an elastomeric seal 28 secured thereto. The support ring 27 engages the inner cylindrical side wall 20 of the bearing cup 19 in a press fit relationship. A portion of the illustrated support ring 27 extends radially inwardly toward the trunnion 14, although such is not necessary. The elastomeric seal 28 is secured to the support ring 27 by any conventional means, such as by adhesive bonding. One or more lips 29 are formed on the elastomeric seal 28 and extend radially inwardly into sealing engagement with the cylindrical side surface 16 of the trunnion 14. An annular dust guard 30 is disposed about the open end of the bearing cup 19. The dust guard 30 is also conventional in the art and is formed from a relatively stiff material, such as nylon. The illustrated dust guard 30 is mounted on the cylindrical side surface 16 of the trunnion 14 in a press fit relationship, although such is not necessary. For example, the dust guard 30 may be mounted on the cylindrical side wall 20 of the bearing cup 19.

Referring back to FIG. 1, the illustrated universal joint assembly 10 further includes a half round end yoke, indicated generally at 31. However, it will be appreciated that the invention can also be used with a full round end yoke or other type of yoke. The end yoke 31 includes a body portion 32 having a pair of opposed arms 33 extending outwardly therefrom. Each of the opposed arms 33 has a semi-cylindrical recess 34 formed therein. A pair of nibs 35 (only one is shown) are formed integrally on the end yoke 31, one on each of the opposed arms 33. The nibs 35 are located at the centers of the semi-cylindrical recesses 34 and extend partially inwardly thereof. Each of the opposed arms 33 terminates in a pair of threaded apertures 36. When the cross 11 is assembled with the end yoke 31, the bearing cups 19 mounted on two opposed trunnions 14 of the cross 11 are received in the semi-cylindrical recesses 34 of the opposed arms 33 of the end yoke 31. In this position, the nibs 35 abut the end walls 21 of the bearing cups 19 to restrain them from moving axially off of the trunnions 14.

In the illustrated embodiment, retainer straps 37 are provided for retaining the bearing cups 19 within the semi-cylindrical recesses 34 of the end yoke 31. However, other conventional retaining means can be used depending on the type of assembly, for example snap rings, retainer caps, or U-bolts. Each of the illustrated retainer straps 37 has a curved central portion which extends partially about the cylindrical side wall 20 of the associated bearing cup 19. The retainer strap 37 terminates in a pair of end portions having respective non-threaded openings 38 formed therethrough. Threaded fasteners 39 extend through the non-threaded openings 38 into cooperation with the threaded apertures 36 to secure the retainer straps 37 to the opposed arms 33 of the end yoke 31. As a result, the bearing cups 19 are retained within the respective semi-cylindrical recesses 34 of the end yoke 31, trapped between the nibs 35.

Referring now to FIGS. 2 and 3, the two-piece thrust washer 25 of the invention is illustrated in more detail. The two-piece thrust washer 25 is generally annular in shape. The thrust washer 25 is formed from two separate pieces of material, a first piece 40 and a second piece 41. The first piece 40 is generally annular in shape, and is sized to be disposed between the axially outer ends 24 of the bearings 23 and the end wall 21 of the bearing cup 19. The illustrated first piece 40 is generally rectangular in cross section, although other cross-sectional shapes are also suitable. The first piece 40 has an axially inner surface 42, which is adapted to engage the axially outer ends 24 of the bearings 23, and an axially outer surface 43 which is adapted to engage the end wall 21 of the bearing cup 19. The first piece 40 also has a radially inwardly facing surface 44 (i.e., facing inwardly toward the trunnion 14), and a radially outwardly facing surface 45 (i.e., facing outwardly toward the inner cylindrical side wall 20 of the bearing cup 19).

The first piece 40 has a thickness defined by the distance between the axially inner surface 42 and the axially outer surface 43. Preferably, the first piece 40 has a thickness sufficient to position the axially outer ends 24 of the bearings 23 past the recess 22 of the bearing cup 19 and the chamfer 18 of the trunnion 14, as best shown in FIG. 3. When the bearings 23 are so positioned, the axially outer ends 24 are supported on both sides by the bearing cup 19 and the trunnion 14. If the axially outer ends 24 were unsupported between the recess 22 and the chamfer 18, the axially outer ends 24 would be subjected to stress during operation of the universal joint assembly 10 which could cause premature failure of the bearings 23. The first piece 40 has a width defined by the distance between the radially inner surface 44 and the radially outer surface 45. Preferably, the width of the first piece 40 is approximately the same as the diameter of the bearings 23.

A circumferential recess 46 is formed in the first piece 40 at the junction between the radially inner surface 44 and the axially outer surface 43. Preferably, the circumferential recess 46 is generally rectangular in cross section. The illustrated circumferential recess 46 extends about one-half the distance between the axially outer surface 43 and the axially inner surface 42, and about one-third the distance between the radially inner surface 44 and the radially outer surface 45. The purpose of the circumferential recess 46 will be described below. Preferably, the junction between the axially outer surface 43 and the radially outer surface 45 of the first piece 40 is curved, as shown at 47. The curved edge 47 has generally the same curvature as the recess 22 in the bearing cup 19. The curved edge 47 and the recess 22 permit the first piece 40 to move radially relative to the trunnion 14 and the bearing cup 19 for proper positioning.

The second piece 41 of the thrust washer 25 is generally annular in shape. When assembled, the second piece 41 extends in a common plane with the first piece 40 and is generally concentric with the first piece 40. The second piece 41 is sized to be disposed between the trunnion 14 and the end wall 21 of the bearing cup 19. The second piece 41 includes an outer circumferential portion 49 which extends radially outwardly past the cylindrical side surface 16 of the trunnion 14, as best shown in FIG. 3. Preferably, the second piece 41 has a generally thin, planar cross section and extends in the radial direction. The second piece 41 has an axially inwardly facing surface 50 which engages the axially outer end 17 of the trunnion 14 and an axially outwardly facing surface 51 which engages the end wall 21 of the bearing cup 19. The second piece 41 also has a radially inwardly facing surface 52 (see FIG. 2) and a radially outwardly facing surface 53.

The second piece 41 has a thickness defined by the distance between the axially inner surface 50 and the axially outer surface 51. Preferably, the thickness of the second piece 41 is less than the thickness of the first piece 40. More preferably, the second piece 41 has a thickness about one-fourth to one-half the thickness of the first piece 40. The second piece 41 has a width defined by the distance between the radially inner surface 52 and the radially outer surface 53. Preferably, the second piece 41 has a width sufficient to extend most of the distance between the cylindrical side surface 16 of the trunnion 14 and the internal passageway 15 of the trunnion 14. The width of the second piece 41 is greater than the width of the first piece 40. In the illustrated embodiment, the second piece 41 has a width about two to three times as great as the width of the first piece 40. However, the relative sizes of the first piece 40 and second piece 41 are dependent on the particular design of the universal joint assembly. For example, the width of the second piece 41 could be ten to fifteen times as great as the width of the first piece 40.

As shown in FIGS. 1 and 3, a plurality of lubrication grooves 54 are formed across the axially inner surface 50 of the second piece 41. In the illustrated embodiment, the second piece 41 has four of such lubrication grooves 54. The lubrication grooves 54 extend from the radially inner surface 52 to the radially outer surface 53 of the second piece 41. The lubrication grooves 54 provide passageways for the flow of lubricant from the internal passageway 15 to the bearings 23. As an alternative to the lubrication grooves 54 in the second piece 41, lubrication grooves could be formed in the axially outer end 17 of the trunnion 14.

The second piece 41 of the thrust washer 25 is sized to be disposed within the first piece 40. As shown in FIGS. 2 and 3, the outer circumferential portion 49 of the second piece 41 extends into the circumferential recess 46 of the first piece 40. Preferably, the second piece 41 and circumferential recess 46 are sized so that the axially outer surface 51 of the second piece 41 is generally flush with the axially outer surface 43 of the first piece 40 during operation of the universal joint assembly 10.

A predetermined small clearance is provided between the first piece 40 and the second piece 41. The clearance is such that during operation of the universal joint assembly 10, the first piece 40 and the second piece 41 do not interfere with their motion of one another. For example, the first piece 40 and the second piece 41 do not pinch or bind during operation. In the illustrated embodiment, the clearance is provided by a relatively small first annular space 55 between the circumferential recess 46 of the first piece 40 and the axially-inner surface 50 of the second piece 41. Similarly, a relatively small second annular space 56 is provided between the circumferential recess 46 of the first piece 40 and the radially outer surface 53 of the second piece 41. However, the first piece 40 and second piece 41 can touch one another so long as they do not interfere with the motion of one another.

The first piece 40 and second piece 41 of the thrust washer 25 are each manufactured from a material that is suitable as a bearing surface. The material is relatively strong and preferably has a relatively low coefficient of friction. Suitable materials are well known to persons skilled in the art, and include certain polymeric materials such as plastics, nylon, combinations of plastic and nylon, and combinations of plastic and TEFLON (polytetrafluoroethylene). The polymeric materials are preferably reinforced with glass fibers, carbon fibers, or other reinforcing fibers. Lubricity enhancers or other additives can be included in the polymeric materials to achieve the desired properties. The first piece 40 and second piece 41 can also be manufactured from ferrous or nonferrous metals such as steel or bronze alloy. Preferably, the first piece 40 and the second piece 41 are manufactured by a forming process such as molding.

The two-piece thrust washer 25 of the invention provides greater flexibility in the selection of materials than a one-piece thrust washer. The first piece 40 and the second piece 41 can be formed of different materials specifically tailored to their somewhat different functions. The first piece 40 is formed of a material capable of withstanding frequent impacts and rotational friction caused by movements of the is bearings 23. The second piece 41 can be formed of a different material to withstand the pressure and relatively small rotational movements of the trunnion 14. Of course, the first piece 40 and second piece 41 can also be formed of the same material.

After assembly, the first piece 40 of the thrust washer 25 is disposed between the bearings 23 and the end wall 21 of the bearing cup 19. The second piece 41 of the thrust washer 25 is disposed between the trunnion 14 and the end wall 21 of the bearing cup 19. The outer circumferential portion 49 of the second piece 41 is disposed inside the circumferential recess 46 of the first piece 40. The outer circumferential portion 49 cooperates with the circumferential recess 46 to prevent the second piece 41 from falling out of the bearing cup 19 when it is removed from the trunnion 14 during shipment, assembly, and disassembly. The first piece 40 is retained within the bearing cup 19 by virtue of its engagement with the bearings 23.

In operation, the clearance between the first piece 40 and the second piece 41 allows a limited amount of relative movement therebetween. Consequently, if the trunnion 14 applies uneven pressure against the second piece 41 of the thrust washer 25, the first piece 40 of the thrust washer 25 is relatively unaffected and can move normally. As a result, the first piece 40 is not subjected to excessive wear from engagement with the bearings 23.

Figure 5:
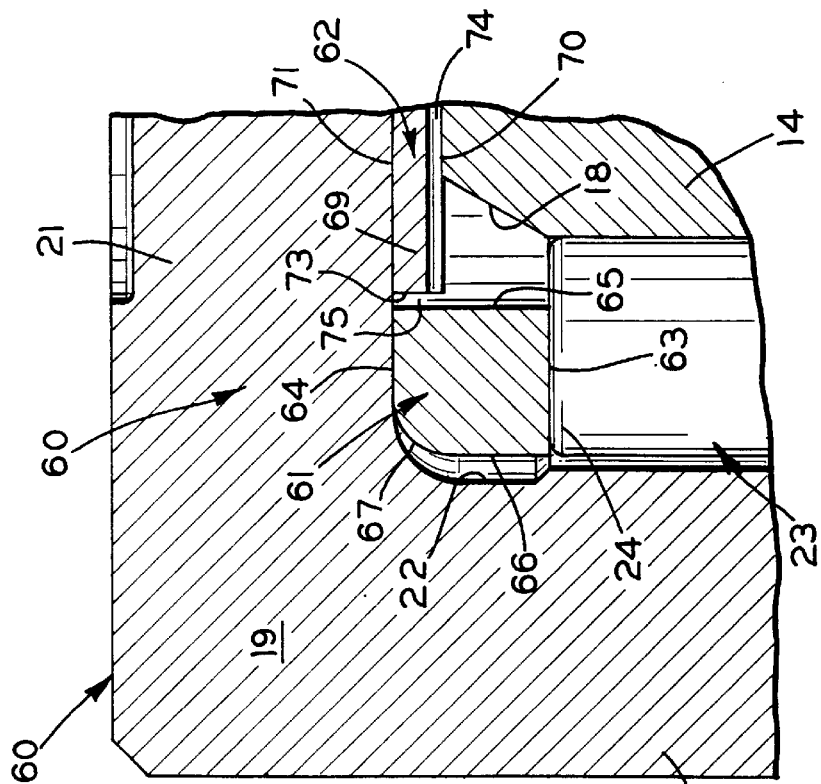
FIG. 5 is a further enlarged view of a portion of FIG. 4 illustrating in more detail the structure of the second embodiment of the two-piece thrust washer.
Figure 4:
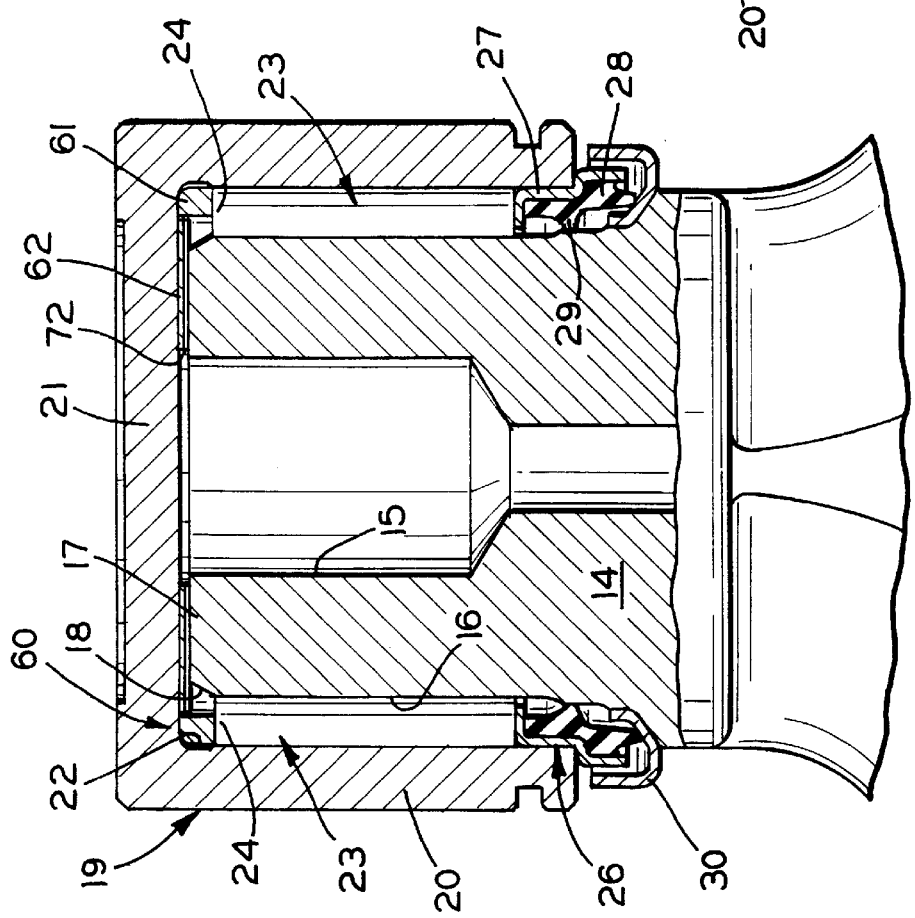
FIG. 4 is an enlarged elevational view, partially in cross section, of one of the trunnions illustrated in FIG. 1 having a bearing cup mounted thereon and a second embodiment of a two-piece thrust washer disposed between the trunnion and the bearing cup.

Referring now to FIGS. 4 and 5, an alternate embodiment of the two-piece thrust washer, indicated generally at 60, of this invention is illustrated in detail. The two-piece thrust washer 60 is generally annular in shape. The thrust washer 60 is formed from two separate pieces of material, a first piece 61 and a second piece 62. The first piece 61 is generally annular in shape and is sized to be disposed between the axially outer ends 24 of the bearings 23 and the end wall 21 of the bearing cup 19. The illustrated first piece 61 is generally rectangular in cross section. The first piece 61 has an axially inwardly facing surface 63 adapted to engage the axially outer ends 24 of the bearings 23 and an axially outwardly facing surface 64 adapted to engage the end wall 21 of the bearing cup 19. The first piece 61 also has a radially inwardly facing surface 65 (i.e., facing inwardly toward the trunnion 14) and a radially outwardly facing surface 66 (i.e., facing outwardly toward the inner cylindrical side wall 20 of the bearing cup 19). The illustrated first piece 61 has a curved edge 67 between the axially outer surface 64 and the radially outer surface 66. Unlike the thrust washer 25 described above, however, the alternate embodiment of the thrust washer 60 does not have a circumferential recess.

The second piece 62 of the thrust washer 60 is generally annular in shape. When assembled, the second piece 62 extends in a common plane with the first piece 61 and is generally concentric with the first piece 61. The second piece 62 is sized to be disposed between the trunnion 14 and the end wall 21 of the bearing cup 19. It includes an outer circumferential portion 69 which extends past the cylindrical side surface 16 of the trunnion ion 14, as best shown in FIG. 5. Preferably, the second piece 62 has a generally thin, planar cross section which extends in the radial direction. The second piece 62 has an axially inwardly facing surface 70 which engages the axially outer end 17 of the trunnion 14 and an axially outwardly facing surface 71 which engages the end wall 21 of the bearing cup 19. The second piece 62 also has a radially inwardly facing surface 72 (see FIG. 4) and a radially outwardly facing surface 73. A plurality of lubrication grooves (one of which is shown at 74 in FIG. 5) are formed across the axially inner surface 70 of the second piece 62.

The second piece 62 of the thrust washer 60 is sized to be disposed within the first piece 61. The radially outer surface 73 of the second piece 62 extends adjacent to the radially inner surface 65 of the first piece 61. A predetermined small clearance is provided between the first piece 61 and the second piece 62. In the illustrated embodiment, the clearance is provided by a relatively small annular space 75 between the radially inner surface 65 of the first piece 61 and the radially outer surface 73 of the second piece 62. In the same manner as described above, the clearance between the first piece 61 and the second piece 62 allows a limited amount of relative movement therebetween during operation of the universal joint assembly 10.

Although the two-piece thrust washer has been described and illustrated in its preferred embodiments, it will be appreciated that other similar structures are contemplated to be within the scope of this invention. For example, the first and second pieces may be formed having different cross sections and overall shapes. The dimensions of the two-piece thrust washer can vary greatly depending on the size of the universal joint assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A thrust washer for a universal joint assembly comprising:

a first piece defining a first thickness, said first piece having a radial outer surface; and a second piece defining a second thickness that is greater than said first thickness, said second piece having an opening formed therethrough defining an inner surface, said first piece being disposed within said opening of said second piece with at least one space defining a predetermined clearance between said radial outer surface of said first piece and said inner surface of said second piece to permit relative movement of said first and second pieces.

2. The thrust washer defined in claim 1, wherein said first thickness of said first piece is defined between inner and outer axial surfaces thereof, said second thickness of said second piece is defined between inner and outer axial surfaces thereof, and said first thickness is approximately one-fourth to one-half of said second thickness.

3. The thrust washer defined in claim 1 wherein said first piece has an opening formed therethrough defining a radial inner surface.

4. The thrust washer defined in claim 3 wherein said first piece has a first width defined between said radial inner surface and said radial outer surface thereof, said second piece has a second width defined between said inner surface and an outer surface thereof, and said first width is approximately two to three times larger than said second width.

5. The thrust washer defined in claim 1 wherein said first piece and said second piece have respective outer axial surfaces that are generally flush with one another.

6. The thrust washer defined in claim 1 wherein said first piece has a groove formed on an inner axial surface thereof.

7. The thrust washer defined in claim 1 wherein said inner surface of said second piece extends axially from an inner axial surface to an outer axial surface of said second piece.

8. The thrust washer defined in claim 1 wherein a recess is formed in said second piece, and wherein said inner surface of said second piece extends within said recess.

9. The thrust washer defined in claim 8 wherein said inner surface of said second piece extends radially within said recess.

10. The thrust washer defined in claim 1 wherein said inner surface of said second piece extends axially within said recess.

11. The thrust washer defined in claim 8 wherein said inner surface of said second piece comprises two surfaces that extend both radially and axially within said recess.

12. A universal joint assembly comprising:

a cross including a body having a trunnion extending therefrom, said trunnion having an outer side surface and an outer end surface;

a bearing cup mounted on said trunnion, said bearing cup including an inner side surface disposed adjacent said outer side surface of said trunnion and an inner end surface disposed adjacent said outer end surface of said trunnion;

a plurality of bearings disposed between said outer side surface of said trunnion and said inner side surface of said bearing cup to permit relative rotational movement therebetween, said bearings including ends disposed adjacent said inner end surface of said bearing cup; and a two-piece thrust washer including a first piece disposed between said outer end surface of said trunnion and said inner end surface of said bearing cup and a second piece disposed between said ends of said bearings and said inner end surface of said bearing cup, said first piece defining a first thickness and having a radial outer surface, said second piece defining a second thickness that is greater than said first thickness, said second piece having an opening formed therethrough defining an inner surface, said first piece being disposed within said opening of said second piece with at least one space defining a predetermined clearance between said outer radial surface of said first piece and said inner surface of said second piece to permit relative movement of said first and second pieces.

13. The universal joint assembly defined in claim 12 wherein said first thickness of said first piece is defined between inner and outer axial surfaces thereof, said second thickness of said second piece is defined between inner and outer axial surfaces thereof, and said first thickness is approximately one-fourth to one-half of said second thickness.

14. The universal joint assembly defined in claim 12 wherein said first piece has an opening formed therethrough defining a radial inner surface.

15. The universal joint assembly defined in claim 14 wherein said first piece has a width defined between said radial inner surface and said radial outer surface thereof, said second piece has a second width defined between said inner surface and an outer surface thereof, and said first width is approximately two to three times larger than said second width.

16. The universal joint assembly defined in claim 12 wherein said first piece and said second piece have respective outer axial surfaces that are generally flush with one another.

17. The universal joint assembly defined in claim 12 wherein said first piece has a groove formed on an inner axial surface thereof.

18. The universal joint assembly defined in claim 12 wherein said inner surface of said second piece extends axially from an inner axial surface to an outer axial surface of said second piece.

19. The universal joint assembly defined in claim 12 wherein a recess is formed in said second piece, and wherein said inner surface of said second piece extends within said recess.

20. The universal joint assembly defined in claim 19 wherein said inner surface of said second piece extends radially within said recess.

21. The universal joint assembly defined in claim 19 wherein said inner surface of said second piece extends axially within said recess.

22. The universal joint assembly defined in claim 19 wherein said inner surface of said second piece comprises two surfaces that extend both radially and axially within said recess.

* * * * *

UNITED STATES PATENT AND TRADEMARK OFFICE
CERTIFICATE OF CORRECTION

PATENT NO. : 5,865,678
DATED : February 2, 1999
INVENTOR(S) : James G. Koedam and Daniel C. Perry It is certified that error appears in the above-identified patent and that said Letters Patent is hereby corrected as shown below:

Column 8, Claim 10, Line 1, after "claim", change "1" to -- 8 --.

Signed and Sealed this

Eighteenth Day of May, 1999

Attest:

Attesting Officer

Q. TODD DICKINSON

Acting Commissioner of Patents and Trademarks